United States Patent [19]
Meyer

[11] Patent Number: 5,479,744
[45] Date of Patent: Jan. 2, 1996

[54] MOVABLE UTILITY GREENHOUSE

[76] Inventor: Scott A. Meyer, 6205 S. 12th St., Phoenix, Ariz. 85040

[21] Appl. No.: 251,895

[22] Filed: Jun. 1, 1994

[51] Int. Cl.⁶ .................................................. A01G 9/16
[52] U.S. Cl. .................................. 52/63; 52/222; 47/17; 135/119; 135/124
[58] Field of Search .............................. 52/222, DIG. 13, 52/63, 86; 135/124, 125, 119, 908, 100, 117; 47/17 R, 17 FM; D25/15

[56] References Cited

U.S. PATENT DOCUMENTS

| | | | |
|---|---|---|---|
| 912,184 | 2/1909 | Scott | 135/124 X |
| 2,661,010 | 12/1953 | Powers et al. | 135/100 |
| 2,719,384 | 10/1955 | Eames | 135/117 X |
| 2,733,784 | 2/1956 | Berry | 52/11 X |
| 3,103,083 | 9/1963 | Seeger | 52/63 |
| 3,365,846 | 1/1968 | Sperling | 52/86 |
| 3,441,037 | 4/1969 | Transeau | 135/119 X |
| 3,448,748 | 6/1969 | Walrave | 135/119 X |
| 3,545,461 | 12/1970 | Carlson | 135/100 X |
| 4,121,604 | 10/1978 | Rain | 52/63 X |
| 4,154,253 | 5/1979 | McCullough | 135/124 |
| 4,751,936 | 6/1988 | Zibble et al. | 135/117 |
| 4,838,293 | 6/1989 | Novak | 135/100 |
| 4,887,397 | 12/1989 | Peterson | 52/86 |
| 4,938,243 | 7/1990 | Foster | 135/901 X |
| 5,067,505 | 11/1991 | Cantwell et al. | 135/125 |
| 5,140,768 | 8/1992 | Forbes | D25/15 X |
| 5,273,142 | 12/1993 | Weber | 135/125 X |

FOREIGN PATENT DOCUMENTS

| | | | |
|---|---|---|---|
| 1526096 | 9/1978 | United Kingdom | 47/17 |

OTHER PUBLICATIONS

"Velcro Product News", Velcro Corp., 1976.
"Trox House", Trox Manufacturing Co., 1962.

*Primary Examiner*—Carl D. Friedman
*Assistant Examiner*—Laura A. Saladino
*Attorney, Agent, or Firm*—Lowell W. Gresham; Jordan M. Meschkow

[57] ABSTRACT

A utility greenhouse (10) has a frame (30) comprised of electrical metal tubing (EMT) sections. Main frame members (12) bear the majority of the building's load. Main frame members (12), long side members (14) and short side members (16) all embed into the ground and are shaped to extend vertically upward for a wall height distance then curve upwards and inward so that a pronounced rounded appearance for the frame (30) results. The main frame members (12) and the long frame members (14) intersect the short frame members (16). Ties (26) secure the intersecting frame members together. A continuous sheet plastic skin (24) overlies the frame. The skin (24) is held to the frame (30) at an outer cover brace (18), an inner cover brace (20), and through ties (26) which secure skin (24) to the long and short frame members (14, 16). A door (54) is formed by cutting the skin (24).

17 Claims, 4 Drawing Sheets

MOVABLE UTILITY GREENHOUSE

TECHNICAL FIELD OF THE INVENTION

The present invention relates generally to utility grade greenhouses which incorporate transparent or translucent flexible sheet material draped over a frame.

BACKGROUND OF THE INVENTION

Traditional greenhouses are complex and expensive structures. They tend to be permanent buildings. Their construction often requires the procurement of building permits, and they cannot be easily moved from one location to another. Moreover, they are often difficult to construct. Even a small 8'×12' greenhouse may take several days to construct after the permits have been approved and materials obtained. If individuals are interested in constructing a small greenhouse for growing their own vegetables or flowers, the high cost and complex building process make traditional greenhouses impractical. In addition, traditional greenhouses often incorporate glass panels, which pose a danger from breakage. Furthermore, they often incorporate rust-prone frame members or chemically-treated wood beams, both of which are undesirable materials for use around a food supply.

Temporary greenhouses have been developed to address some of the problems posed by traditional greenhouses. A temporary greenhouse is typically a much simpler structure and less expensive than an equivalently sized traditional greenhouse. And, a building permit is typically not required to construct a temporary greenhouse because it is not a permanent building.

While conventional temporary greenhouses address some of the problems posed by traditional greenhouses, they pose a new set of problems while not entirely answering the traditional greenhouse shortcomings. For example, while temporary greenhouses are typically less expensive than permanent greenhouses, they are still often too expensive to justify individual use, particularly when one considers their temporary nature. Furthermore, conventional greenhouses do not have a shape which favors maximum sun exposure regardless of time of day or time of year. Consequently, to insure the maximum amount of sunlight inside the greenhouse, the greenhouse must be precisely oriented relative to the direction of travel in the sky by the sun. Even with such precise orientation, reduced amounts of sunlight penetrate into the greenhouse at certain times of day and times of the year relative to that available if other orientations were chosen.

Still further, one typically does not use a greenhouse in a truly temporary manner because plant growing seasons continue for months on end, and users often use greenhouses to grow plants season after season. However, temporary greenhouses are often flimsy structures which offer significant wind resistance and are easily blown away in a nominally high wind. In addition, temporary greenhouses often use polyvinyl chloride (PVC) frame members. Unfortunately, the sunlight needed for the plants in the greenhouse tends to deteriorate such frame members, causing cracking or brittleness within a short period of time. Moreover, conventional temporary greenhouses are often low structures with very little standing or vertical plant stacking room, particularly near walls. Consequently they are difficult and uncomfortable spaces within which to work, and they hold only a few plants for the amount of area required. In short, neither traditional nor temporary greenhouses adequately serve the needs of a utility greenhouse.

SUMMARY OF THE INVENTION

Accordingly, it is an advantage of the present invention that an improved utility greenhouse is provided.

Another advantage of the present invention is that a movable utility greenhouse is provided.

Another advantage is that the present invention provides a durable utility greenhouse.

Another advantage is that the present invention provides a utility greenhouse which remains stable in high winds.

Another advantage is that the present invention provides a utility greenhouse which allows a desirable amount of sunlight to penetrate into the interior of the greenhouse during substantially all daylight hours and at substantially all times of the year.

Another advantage is that the present invention provides a utility greenhouse having frame members that do not deteriorate in sunlight.

Another advantage is that the present invention provides a utility greenhouse which is inexpensive to procure and easy to construct.

The above and other advantages of the present invention are carried out in one form by a durable, movable utility greenhouse. The greenhouse includes a plurality of electrical metal tubing (EMT) frame members. A plurality of tie means attaches various ones of the frame members to one another. A flexible sheet material skin overlies the frame members.

The above and other advantages of the present invention are carried out in another form by a durable, movable utility greenhouse which includes a plurality of frame members embedded into the ground and extending upward to define four walls and inward to define a roof. A plurality of tie means attaches various ones of the frame members to one another. A flexible sheet material skin overlies the frame members.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

In the following description of preferred embodiments, certain items are either identical to or mirror images of other items. This description distinguishes such items from their counterparts by the use of lower case alphabetic characters ("a", "b", and so on) which are appended to a common reference number. When an alphabetic character is omitted, the description refers to any one of such items and their counterparts individually or to all of them collectively.

DETAILED DESCRIPTION OF THE PREFERRED EMBODIMENT

Figure 1:
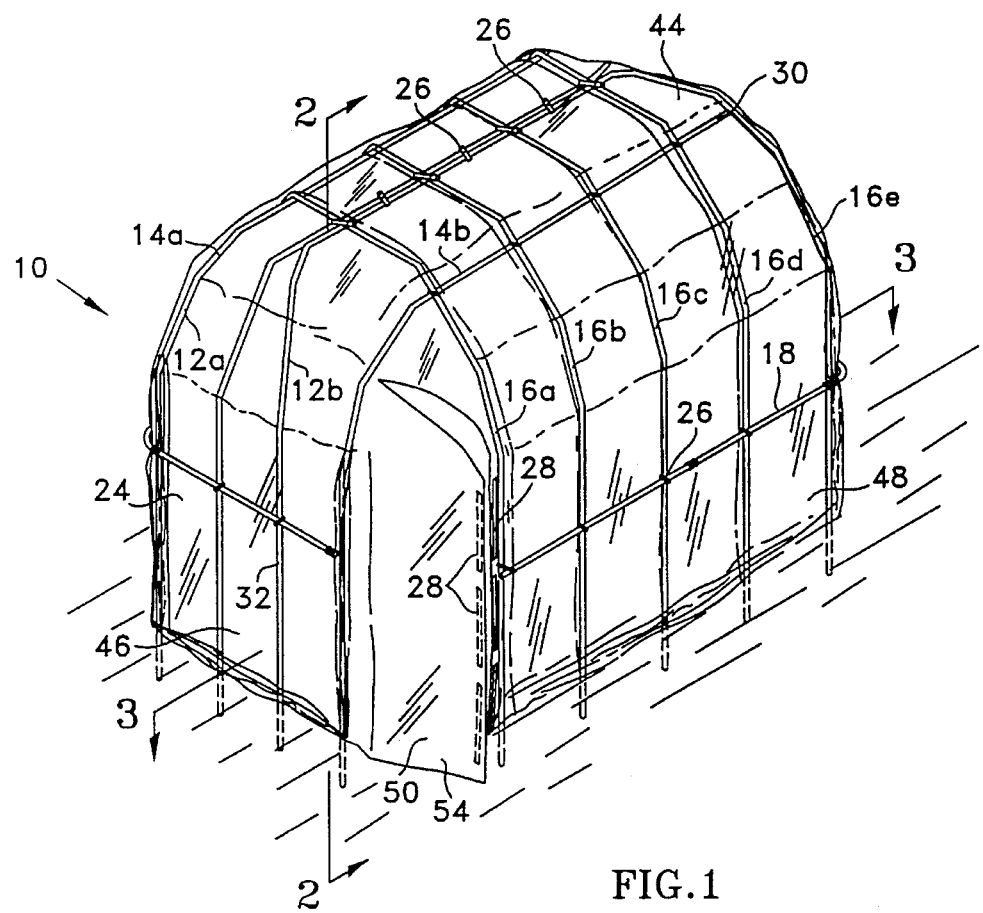
FIG. 1 shows a perspective view of a utility greenhouse constructed in accordance with the teaching of the present invention.
Figure 2:
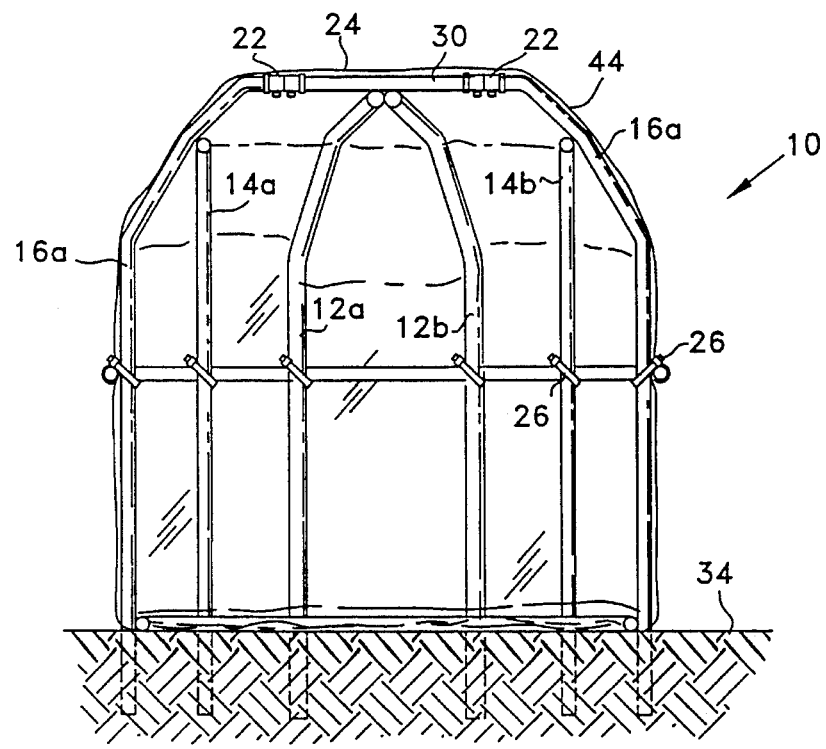
FIG. 2 shows a cross sectional end view of the greenhouse, taken at line 2—3 in FIG. 1.
Figure 3:
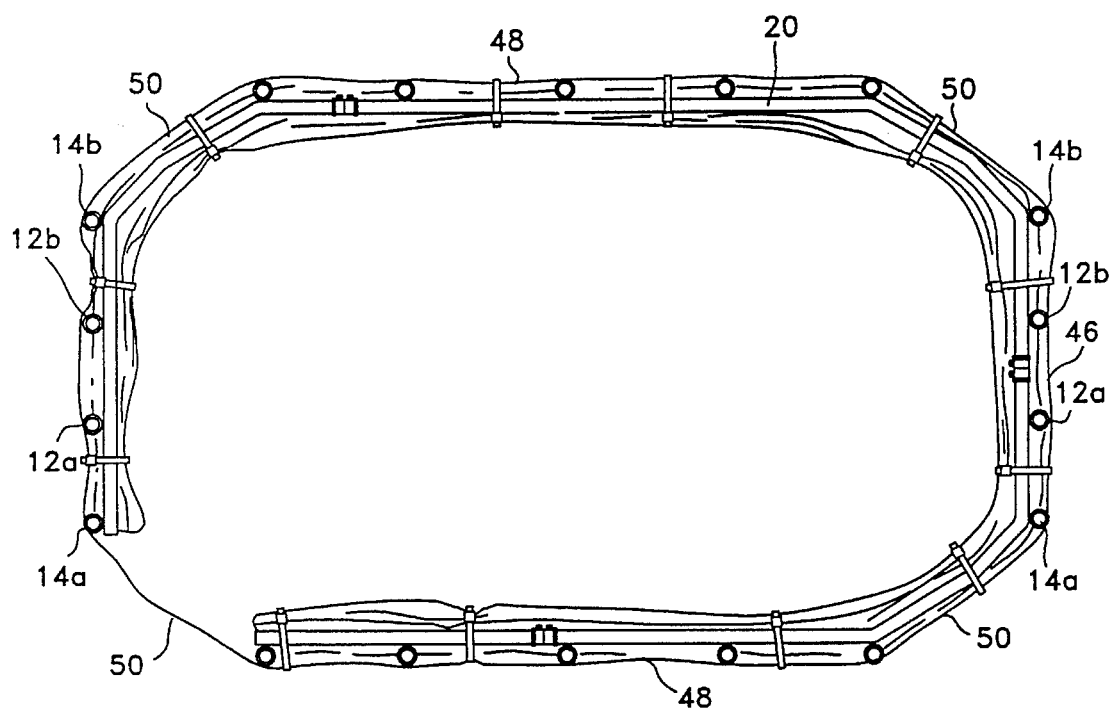
FIG. 3 shows a cross sectional top view of the greenhouse, taken at line 3—3 in FIG. 1.

FIGS. 1–7 show a greenhouse 10 constructed in accordance with the teaching of the present invention. Greenhouse 10 is durable, sturdy, lightweight, movable, inexpensive, easy to construct, and has an arrangement of three-dimensional space which is particularly desirable for greenhouse use. FIG. 1 shows a perspective view of greenhouse 10. FIG. 2 shows a cross sectional end view of greenhouse 10, taken at line 2—3 in FIG. 1. FIG. 3 shows a cross sectional top view of greenhouse 10, taken at line 3—3 in FIG. 1.

With reference to FIGS. 1–3, greenhouse 10 may be constructed using commonly available construction materials. The use of commonly available materials reduces expenses and eases the material procurement process.

The construction materials used in greenhouse 10 include electrical metal tubing (EMT) conduit sections which serve as main frame members 12, long side members 14, short side members 16, outer cover brace 18, and inner cover brace 20. EMT conduit is a desirable choice because it is resistant to sunlight, rust, and rot, light weight yet relatively strong, inexpensive, and readily available in 10' sections. Desirably, main frame members 12 in an 8'×12' greenhouse 10 are made from ¾" EMT while long side members 14, short side members 16, outer cover brace 18, and inner cover brace 20 are made from ½" EMT. In addition, the construction materials include ¾" and ½" EMT couplings 22, a detailed view of which is presented in FIG. 4.

A transparent or translucent plastic sheet serves as a skin 24 for the entire greenhouse 10. The particular type of plastic sheet used for skin 24 is not relevant to the present invention. However, less expensive plastic sheet material typically demonstrates less resistance to sunlight while more expensive plastic sheet materials typically demonstrate better resistance. Furthermore, nothing prevents other materials, such as canvas or substantially opaque plastic to be used for other applications.

Ties 26, such as Nylon cable tie wraps, are used for attaching frame members and cover braces to one another and to skin 24. Desirably, ties 26 are ultraviolet stabilized cable tie wraps, which are typically black in color. Such ties 26 provide the type of sunlight resistance which is desirable in a greenhouse application. In addition, detachable fastening devices 28, such as hook and loop fasteners, are used to hold a door for greenhouse 10 in a closed position.

Main frame members 12, long side members 14, and short side members 16 together form a frame 30. Members 12, 14, and 16 are bent and attached together to define the shape of greenhouse 10. Members 12, 14, and 16 may be bent either at a factory or upon a site where greenhouse 10 is to be constructed using a conventional conduit bending tool.

Figure 5:
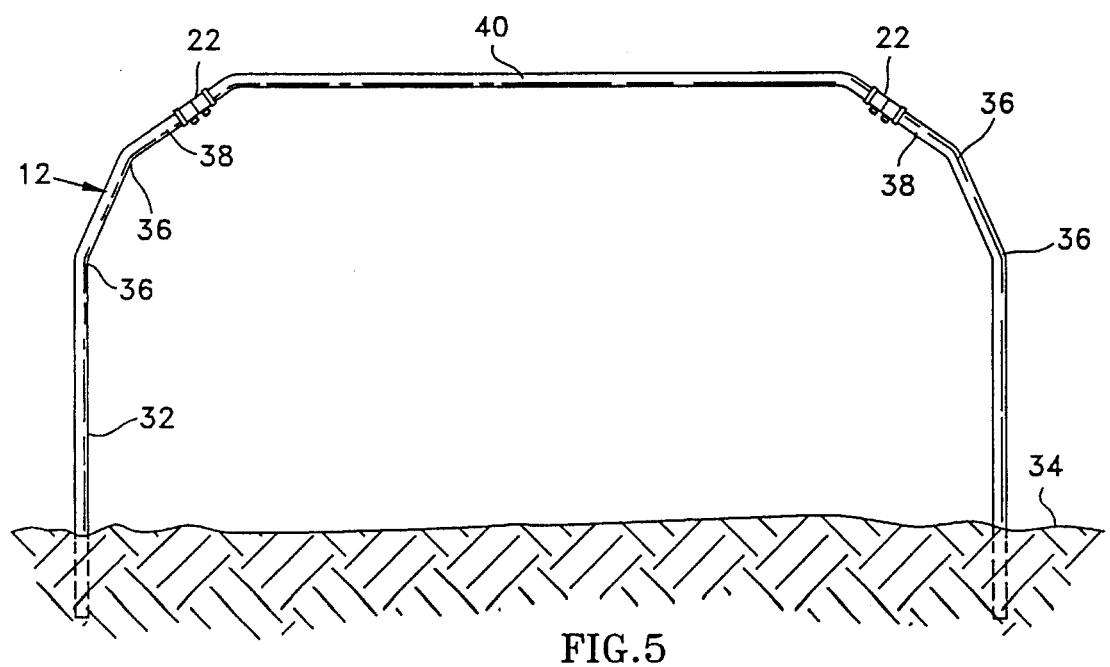
FIG. 5 shows a side view of a single main frame member.

Main frame members 12a and 12b are substantially identical to one another. FIG. 5 shows a side view of one of main frame members 12. Main frame member 12 may be formed from three 10' EMT sections. Vertical sections 32 of main frame member 12 may desirably be cut to around 98" in length. Vertical sections 32 extend upward from a point more than 6" and desirably around 12" beneath a ground level 34 to a point around 5-½' above ground level 34, where they begin to slowly and gently curve upward and inward. In the preferred embodiment this slow, gentle curve is accomplished by the cumulative effect of two slight bends 36 over a distance of around 20". An upper leg 38 of vertical section 32 points partially vertical and partially horizontal, desirably at around 45°.

The upper legs 38 of vertical sections 32 attach to a horizontal section 40 through two couplings 22. For an 8" by 12" greenhouse 10, a 10' EMT conduit may serve as horizontal section 40 without cutting. However, ends of horizontal section 40 are desirably bent slightly, for example at around 9" from each end, to align with upper legs 38 of vertical sections 32. In the preferred embodiment, no couplings 22 are placed in a horizontal plane in main frame 12. Rather, couplings 22 reside at an angle to the horizontal so that a substantial amount of downward force is transmitted through the couplings 22 in a longitudinal direction. This promotes strength by reducing transverse forces on a coupling 22 while achieving a maximum length for greenhouse 10 using 10' sections of EMT conduit. It is horizontal section 40 that defines the 12" dimension of an 8' by 12' greenhouse 10.

Figure 4:
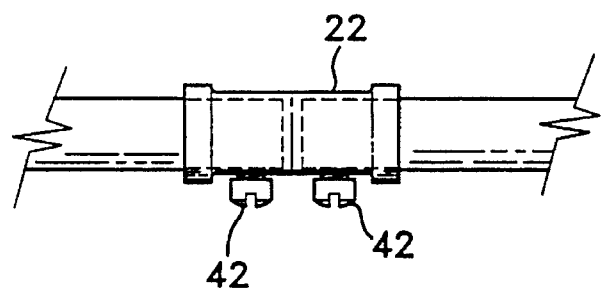
FIG. 4 shows a side view of a coupling used in constructing the greenhouse.

Referring briefly to FIGS. 4 and 5, the couplings 22 which attach horizontal section 40 to vertical sections 32 may include set screws 42 which are loosened to permit the couplings 22 to mate with the EMT conduit and then tightened to secure the EMT conduit in place. Desirably, these couplings 22 and all other couplings 22 in greenhouse 10 are oriented so that set screws 42 face the interior of greenhouse 10. This orientation prevents set screws 42 from rubbing against skin 24 (see FIGS. 1–2) and possibly wearing a hole in skin 24.

Referring to FIGS. 1–2, horizontal sections 40 of main frame members 12a and 12b extend adjacent to each other. Ties 26 firmly attach main frame members 12a and 12b together along horizontal sections 40 thereof. However, main frame members 12 are desirably rotated so that the above-discussed curves in the upper regions of main frame members 12 cause vertical sections 32 of main frame members 12 to diverge from one another and become spaced apart as they approach ground level 34. This configuration promotes the stability of greenhouse 10. Loads placed on the main frame push outward on mainframe members 12 and not strictly downward. Consequently, the combined main frame structure tends not to rock from side to side in the presence of high winds and other lateral forces.

Long side members 14a and 14b extend roughly parallel to main frame members 12. However, long side member 14a is spaced apart from main frame members 12 on one side of members 12, and long side member 14b is spaced apart from members 12 on the other side of members 12. Long side members 14 have a similar shape to main frame members. Members 14 extend upward from roughly the same distance beneath ground level 34 to above ground level 34 for substantially the same 5-½' wall height distance. At this wall height distance above ground level 34, long side members 14 gradually curve upward and inward. In the preferred embodiment, this gradual curve is accomplished through two slight bends over approximately 20" to produce a cumulative curve of 90°. As best viewed in FIG. 2, long side members 14 do not extend to the same overall height as main frame members 12. Each long side member 14 may be constructed from three 10' sections of EMT conduit joined together using two couplings 22. In the preferred embodiment, these couplings 22 (not shown) are oriented horizontally. This horizontal orientation has little influence on the overall strength and stability of greenhouse 10 because the main greenhouse load is carried through main frame members 12, with long side members 14 carrying only a minor portion of the entire load.

Short side members 16a, 16b, 16c, 16d, and 16e extend roughly perpendicular to main frame and long side members 12 and 14. Members 16 are distributed along the longer sides of greenhouse 10 and define the shorter floor dimension. Members 16 have a similar shape to main frame members 12 and long side members 14. Members 16 extend upward from roughly the same distance beneath ground level 34 to above ground level 34 for substantially the same wall height distance. At this wall height distance above ground level 34, short side members 16 gradually curve upward and inward. In the preferred embodiment, this gradual curve is accomplished through four very slight bends over approximately a 36" distance to produce a cumulative curve of 90°. As best viewed in FIG. 2, at full central height, short side members 16 extend slightly above the overall height achieved by main frame members 12 and contact main frame members 12. While curving upward and inward, short side members 16 contact the top side of long side members 14. Ties 26 attach short side members 16 to long side members 14 and main frame members 12 at the points where they cross one another.

Each short side member 16 may be constructed from three 10' sections of EMT conduit joined together using two couplings 22. In the preferred embodiment, these couplings 22 (see FIG. 2) are also oriented horizontally. This horizontal orientation has little influence on the overall strength and stability of greenhouse 10 because the main greenhouse load is carried through main frame members 12, with short side members 16 carrying only a minor portion of the entire load.

As illustrated in FIGS. 1–3, greenhouse 10 has a pronounced rounded appearance. From the wall height upward, greenhouse 10 has a rounded roof 44 on all sides. The rounded roof allows greenhouse 10 to present a substantially normal surface to the sun regardless of the sun's position in the sky. Thus, one need not take precautions to properly orient greenhouse 10 relative to the path traveled by the sun in the sky in order to insure maximum sun exposure inside greenhouse 10.

Moreover, the rounded roof tends to prevent the formation of pockets which might accumulate water when skin 24 gets wet, and the rounded roof structure on all sides reduces wind resistance and promotes stability. In addition, greenhouse 10 has no corners between short sides 46 of greenhouse 10 and long sides 48 of greenhouse 10. Since no frame member resides at an intersection between short and long sides 46 and 48, no sharp corner forms around such a frame member. Rather corner walls 50 form between long side members 14 and adjacent short side members 16. Through the cumulative effect of two much smaller angles, the corner walls of greenhouse 10 gently transition through a 90° corner. The rounded walls further reduce the wind resistance of greenhouse 10 and promote stability.

While greenhouse 10 has a pronounced rounded appearance, its walls 46, 48, and 50 extend upward in a substantially vertical direction for a significant wall height of approximately 5-½'. This substantially vertical projection of walls gives greenhouse 10 a desirable arrangement of three-dimensional space. Shelves may be placed along the walls so that plants may be stacked vertically. Other plants may be hung from frame members, such as main frame members 12. In addition, people who tend the plants can comfortably stand next to the walls without stooping over.

Another feature which promotes stability is the embedding of frame members 12, 14, and 16 into the ground. As discussed above, frame members are embedded into the ground for an average distance of at least 6" and preferably around 12". If embedding one or a few of members 12, 14, or 16 is difficult due to rocks or the like, it need not be embedded the entire distance. Typically, EMT conduit has relatively thin walls and is easy to drive into the ground. If necessary, the ground may be softened with water first, and a stake may be first driven at appropriate locations to provide a pilot hole. The embedding of frame members into the ground serves to further anchor greenhouse 10 and allow it to resist high winds.

Skin 24 is preferably a single, continuous plastic sheet. In other words, greenhouse 10 does not require seams in skin 24. Skin 24 overlies frame 30 and serves as roof 44, side walls 46, side walls 48, and corner walls 50.

A variety of techniques are used to secure skin 24 to frame 30. Due to the use of a substantially flat sheet of plastic to cover frame 30, which curves in three dimensions, excess material puckers in various areas. Rather than cut material and form seams, the preferred embodiment gathers or bunches pockets of excess material in vertical bunches at the edges of corner walls 50. After bunching, such excess plastic may be tied to long side members and short side members 14 and 16 using ties 26. This process requires poking small holes in the plastic on opposing sides of the frame members to accommodate the ties 26. However, these small holes pose no problem since they are small and located on vertical walls. Skin 24 may be tied to frame 30 in other places as well using the same technique, but preferably not in roof 44 due to the undesirability of holes in roof 44.

Figure 6:
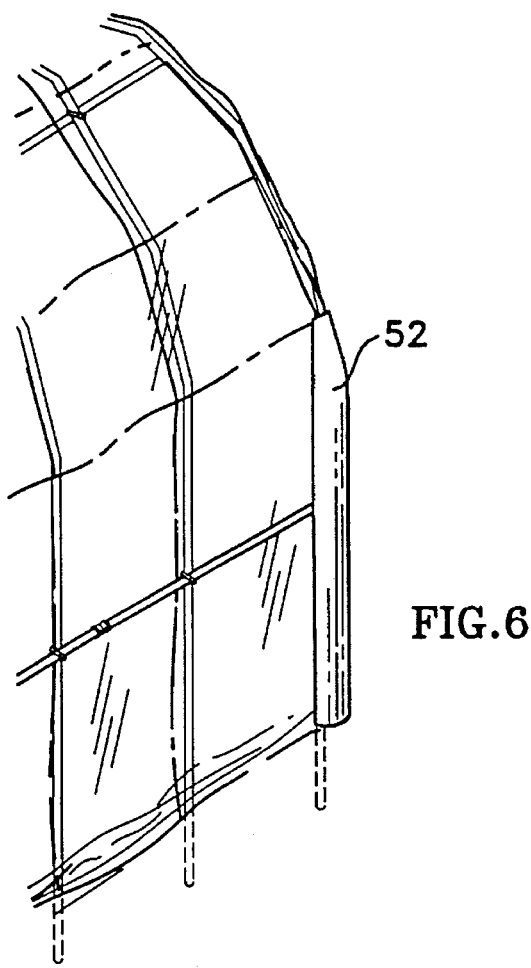
FIG. 6 shows a perspective view of a corner of the greenhouse.

FIG. 6 shows a perspective view of a corner wall 50 edge of greenhouse 10. FIG. 6 illustrates an alternate embodiment where a plastic overleaf or sheath 52 is clamped over the bunched excess plastic. Sheath 52 is included primarily for aesthetic purposes.

Figure 7:
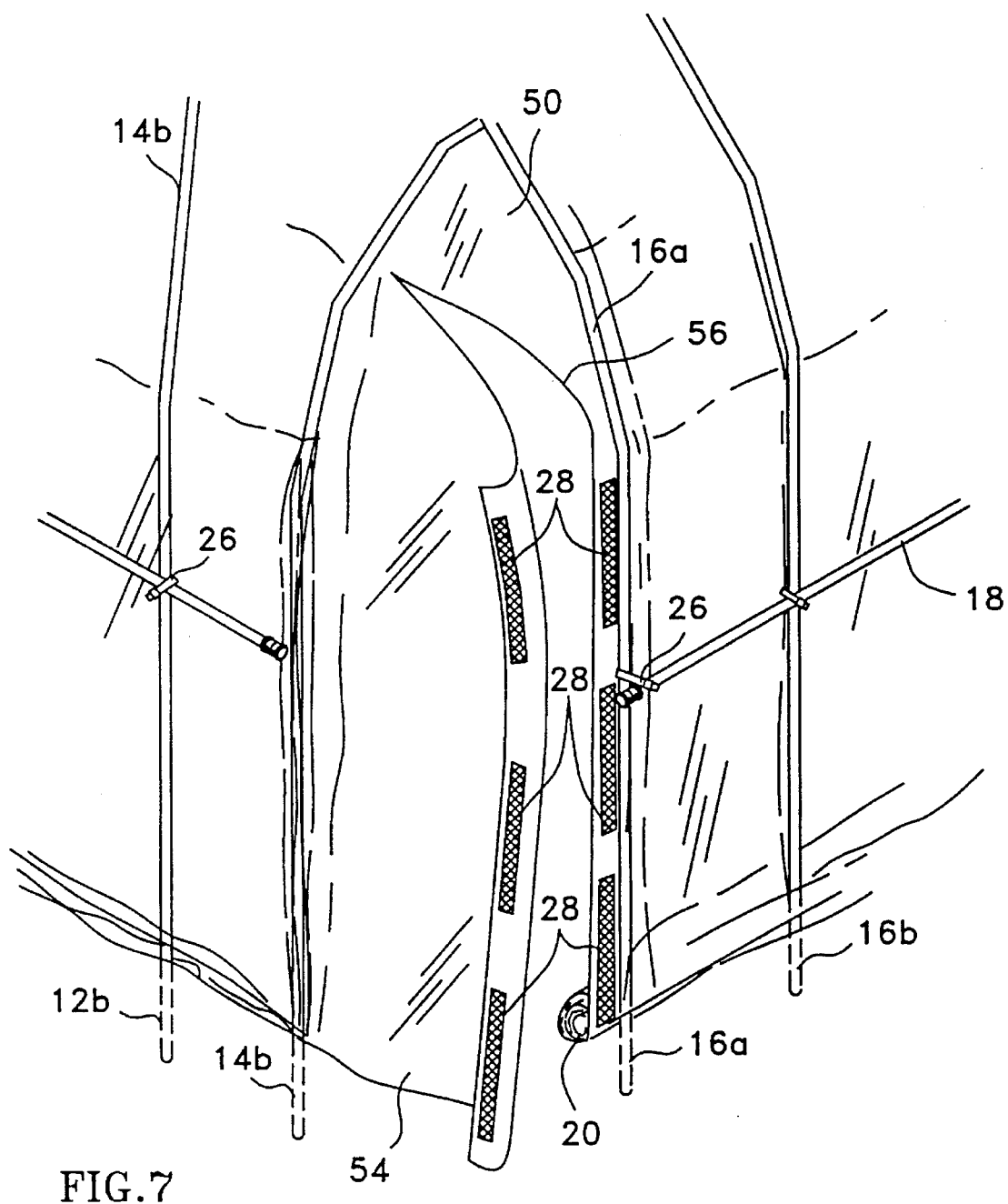
FIG. 7 shows a perspective view of a door portion of the greenhouse.

FIG. 7 shows a door 54 of greenhouse 10. Door 54 need not be formed until after skin 24 has been applied to frame 30. Door 54 may be formed in any one of corner walls 50. A desirable corner wall 50 is selected to meet user needs. Door 54 is formed by first securing excess plastic to long or short side members 14 or 16 so that the corner wall 50 where door 54 will reside is relatively taut. Next, a cut 56 is made in skin 24 using an arcuate down and over motion. After making cut 56, cut 56 extends vertically upward from ground level 34 roughly parallel and a few inches away from a long or short frame member 14 or 16. At approximately the wall height, cut 56 arcs upward and over to form a top edge of door 54.

Hook and loop fasteners 28 are installed on opposing sides of cut 56 so that door 54 may be secured. Desirably, several 6", adhesive backed hook and loop fastener strips are applied at corresponding locations on opposing sides of cut 56. Mating fastener 28 components are preferably placed on the outside of skin 24 near a support frame member 14 or 16 and inside door 54. A small amount of the excess plastic previously bunched together may be let out so that fastener 28 components on door 54 can now mate with complementing fastener 28 components on skin 24.

In addition, outer cover brace 18 and inner cover brace 20 serve to secure skin 24 to frame 30. Braces 18 and 20 are constructed from EMT conduit. They are bent to conform to the circumferential outline of greenhouse 10, except they desirably do not cover the opening for door 54. Several 10' EMT sections may be bent and attached together via couplings 22 to circumferentially extend around greenhouse 10 in a generally horizontal plane. Set screws 42 (see FIG. 4) for couplings 22 used on outer cover brace 18 desirably face outward, and set screws 42 for couplings 22 used on inner cover brace 18 desirably face inward.

Outer cover brace 18 desirably resides outside skin 24 and frame 30 at a height approximately half-way up the 5-½' wall height from ground level 34. Brace 18 desirably attaches to frame members 12, 14, and 16 through ties 26. Holes may be poked in skin 24 to accommodate these ties 26. Outer cover brace 18 provides a relatively large area over which to clamp skin 24 to frame 30. In addition, since brace 18 is outside skin 24, it prevents skin 24 from pillowing outward when wind rushes into greenhouse 10.

Inner cover brace 20 desirably resides inside skin 24 and frame 30 at approximately ground level 34. Brace 20 desirably attaches to frame members 12, 14, and 16 through ties 26. In addition, skin 24 may be rolled around brace 20, after making cuts to allow for frame members, to hold skin 24 taught against frame 30. Holes may be poked in skin 24 at the bottom of frame 30 adjacent inner cover brace 20 to accommodate ties 26, which attach the rolled bottom portions of skin 24 to inner cover brace 20.

Greenhouse 10 may be easily moved to new locations by pulling frame members 12, 14, and 16 out of the ground. Small movements may be accomplished simply by moving the entire assembled structure and re-embedding frame members 12, 14, and 16 into the ground at the new site. Larger movements may be accomplished by disassembly and reassembly. A few new components, such as ties 26, may be required for the re-assembly. However, such few new components are relatively inexpensive.

Conventional greenhouse accessories may be installed in greenhouse 10. Such accessories may include fans, lights, shelving for holding plants, shades, insulation, and the like. Lights and fans may be suspended from frame members 12, 14, and/or 16 with ties 26 or other fasteners. Shades and/or insulation may be placed over skin 24, or inside greenhouse 10 between skin 24 and frame 30.

In summary, the present invention provides an improved utility greenhouse. The greenhouse lends itself to distribution in an inexpensive plan or kit form, and users can successfully assemble the greenhouse with ease in only a few hours. Professional construction services and exotic tools are not required. Once the greenhouse is assembled, it may be moved as needed. This movable nature generally causes it not to require the procurement of building permits. Nevertheless, the greenhouse of the present invention is a sturdy and durable greenhouse. EMT frame members are embedded in the ground and attached together to form a strong frame having a pronounced rounded shape at the roof and all walls. The rounded shape, along with other features, allows the greenhouse to maximize sunlight exposure for plants growing inside and to remain stable in high winds. The EMT frame members remain strong after prolonged exposure to sunlight.

The present invention has been described above with reference to preferred embodiments. However, those skilled in the art will recognize that changes and modifications may be made in these preferred embodiments without departing from the scope of the present invention. For example, while the present invention is particularly adapted to a greenhouse application, nothing prevents the greenhouse from being used for other purposes. While a specific 8' by 12' greenhouse has been described herein, those skilled in the art can devise greenhouses having other dimensions. Orientational terms, such as horizontal, vertical, above, and the like, are used herein for convenience and consistency with the Figures. Those skilled in the art will appreciate that such terms are relative and not absolute in nature. Thus, for example, horizontal means an orientation roughly parallel to the ground whether or not this orientation is absolutely horizontal. These and other changes and modifications which are obvious to those skilled in the art are intended to be included within the scope of the present invention.

What is claimed is:

1. A durable, movable utility greenhouse comprising:

a plurality of electrical metal tubing (EMT) frame members, said frame members extending in a generally upright direction from the ground along for at least a predetermined wall height distance, then curving inward and upward forming a rounded appearance;

a plurality of tie means for attaching various ones of said frame members to one another;

a flexible sheet material skin overlying said frame members, said skin forming four walls and a roof, said four walls including two opposing short walls and two opposing long walls;

wherein said frame members include a first and second main frame members, each of said first and second main frame members extending vertically upward adjacent both of said short walls and generally horizontal adjacent said roof; and wherein said first and second main frame members are attached together proximate said roof and spaced apart along said short walls.

2. A greenhouse as claimed in claim 1 wherein said tie means comprise ultraviolet (UV) stabilized cable tie wraps.

3. A greenhouse as claimed in claim 1 wherein said frame members are configured so that said frame members embed into the ground.

4. A greenhouse as claimed in claim 3 wherein said frame members embed into the ground for an average distance of at least six inches.

5. A greenhouse as claimed in claim 1 wherein:

said frame members additionally include a plurality of side support members;

each of said side support members extends vertically upward adjacent both of said long walls and generally horizontal adjacent said roof;

said side support members are spaced apart from one another; and said tie means attach said side support members to said first and second main frame members.

6. A greenhouse as claimed in claim 1 wherein said skin comprises a continuous plastic sheet which serves as said roof and walls.

7. A greenhouse as claimed in claim 6 wherein:

said plastic sheet has a cut therein extending vertically upward from proximate the ground, said cut forming a door opening; and said greenhouse additionally comprises detachable fastening means attached to said plastic sheet on opposing sides of said cut for selectably closing said door opening.

8. A greenhouse as claimed in claim 1 wherein additional ones of said tie means attach said skin to said frame members.

9. A durable, movable utility greenhouse comprising:

a plurality of frame members embedded into the ground and extending upward to define four walls and inward to define a roof, and wherein said four walls include two opposing short walls and two opposing long walls;

a plurality of tie means for attaching various ones of said frame members to one another;

a flexible sheet material skin overlying said frame members;

wherein said frame members include first and second main frame members;

wherein each of said first and second main frame members extends vertically upward adjacent both of said short walls and generally horizontal adjacent said roof; and wherein said first and second main frame members are attached together proximate said roof and spaced apart along said short walls.

10. A greenhouse as claimed in claim 9 wherein said frame members extend in a generally upright direction from the ground along each of said four walls for at least a predetermined wall height distance, then curve inward and upward so that said roof has a rounded appearance above each of said four walls.

11. A greenhouse as claimed in claim 9 wherein said frame members additionally define four corner walls interspersed between said side walls, said corner walls giving said greenhouse a rounded appearance to reduce wind resistance.

12. A durable, movable utility greenhouse comprising:

a flexible, substantially continuous sheet plastic skin forming two opposing short walls, two opposing long walls, and four corner walls wherein each of said corner walls is interspersed between one of said short walls and one of said long walls, and a roof above said walls;

a plurality of electrical metal tubing (EMT) frame members embedded into the ground and extending in a generally upright direction inside said skin from the ground along each of said four walls for at least a predetermined wall height distance, then curving inward and upward so that said roof has a rounded appearance above each of said four walls, said frame members including first and second main frame members each of which extend vertically upward adjacent both of said short walls and generally horizontal adjacent said roof, said first and second main frame members residing proximate one another adjacent said roof and spaced apart along said short walls;

an outer cover brace extending circumferentially and generally horizontally along and outside said skin and said frame members around at least a portion of said greenhouse;

an inner cover brace extending circumferentially and generally horizontally along and inside said frame members and said skin around at least a portion of said greenhouse, said inner cover brace being spaced vertically below said outer cover brace; and a plurality of tie means for attaching various ones of said frame members and braces to one another.

13. A durable, movable utility greenhouse comprising:

a plurality of electrical metal tubing (EMT) frame members, said frame members extending in a generally upright direction from the ground along for at least a predetermined wall height distance, then curving inward and upward forming a rounded appearance;

a plurality of tie means for attaching various ones of said frame members to one another; and a flexible sheet material skin overlying said frame members, said skin forming four walls and a roof; and an outer cover brace extending circumferentially and generally horizontally along and outside said skin and said frame members around at least a portion of said greenhouse.

14. A greenhouse as claimed in claim 13 wherein said skin forms four side walls, four corner walls interspersed between said side walls, and a roof over said side and corner walls, said corner walls giving said greenhouse a rounded appearance to reduce wind resistance.

15. A greenhouse as claimed in claim 13 wherein said greenhouse additionally comprises an inner cover brace extending circumferentially and generally horizontally along and inside said frame members and said skin around at least a portion of said greenhouse, said inner cover brace being spaced vertically below said outer cover brace.

16. A greenhouse as claimed in claim 15 wherein additional ones of said tie means attach said inner and outer cover braces to said frame members.

17. A durable, movable utility greenhouse comprising:

a plurality of frame members embedded into the ground and extending upward to define four walls and inward to define a roof;

a plurality of tie means attaching various ones of said frame members to one another;

a flexible sheet material skin overlying said frame members; and an outer cover brace extending circumferentially and generally horizontally along and outside said skin and said frame members around at least a portion of said greenhouse.

* * * * *